(12) United States Patent  
Lee et al.

(10) Patent No.: US 8,817,203 B2
(45) Date of Patent: Aug. 26, 2014

(54) BACKLIGHT UNIT AND DISPLAY DEVICE INCLUDING THE SAME

(75) Inventors: Hae Hyung Lee, Seoul (KR); Bang Gun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 326 days.

(21) Appl. No.: 13/159,117

(22) Filed: Jun. 13, 2011

(65) Prior Publication Data

US 2011/0304792 A1 Dec. 15, 2011

(30) Foreign Application Priority Data

Jun. 14, 2010 (KR) .................. 10-2010-0055876

(51) Int. Cl.
*G02F 1/1333* (2006.01)
*G02F 1/1335* (2006.01)

(52) U.S. Cl.
CPC .... *G02F 1/133606* (2013.01); *G02F 1/133608* (2013.01)
USPC .......................................... 349/58

(58) Field of Classification Search
None
See application file for complete search history.

(56) References Cited

U.S. PATENT DOCUMENTS

| 6,552,761 | B1 * | 4/2003 | Seo et al. ................. 349/58 |
| 7,103,259 | B1 | 9/2006 | Kao |
| 7,864,261 | B2 * | 1/2011 | Chen et al. .............. 349/58 |
| 8,303,153 | B2 * | 11/2012 | Ikuta et al. ............. 362/616 |
| 2005/0073624 | A1 | 4/2005 | Lee et al. |
| 2008/0170416 | A1 | 7/2008 | Yuan et al. |
| 2010/0079699 | A1 | 4/2010 | Cho et al. |

FOREIGN PATENT DOCUMENTS

| KR | 2001-0046077 A | 6/2001 |
| KR | 20-0353769 Y1 | 6/2004 |
| KR | 10-2005-0099221 A | 10/2005 |
| KR | 10-2005-0104788 A | 11/2005 |
| KR | 10-2009-0043900 A | 5/2009 |
| KR | 10-2009-0073881 A | 7/2009 |
| KR | 10-2010-0035431 A | 4/2010 |
| WO | WO 2004/015490 A1 | 2/2004 |

* cited by examiner

*Primary Examiner* — Sarah Hahm
(74) *Attorney, Agent, or Firm* — Birch, Stewart, Kolasch & Birch, LLP (57) ABSTRACT

Provided is a backlight unit including, a bracket on which a light emitting device array is disposed, and a bottom cover on which the bracket is disposed, the bottom cover supporting an optical member, wherein a fixing member to removably fix is provided on the bottom cover, the side and top of the fixing member are flat and the cross-sectional area of a lower part of the fixing member is equal to or less than the cross-sectional area of an upper part of the fixing member.

20 Claims, 9 Drawing Sheets

BACKLIGHT UNIT AND DISPLAY DEVICE INCLUDING THE SAME

This application claims the benefit of Korean Patent Application No. 10-2010-0055876, filed on Jun. 14, 2010, which is hereby incorporated by reference as if fully set forth herein.

BACKGROUND OF THE INVENTION

1. Field of the Invention

The present invention relates to a backlight including a light-emitting device and a display device including the same.

2. Discussion of the Related Art

Light emitting devices such as light emitting diodes or laser diodes using Group III-V or Group II-VI compound semiconductor materials can reproduce a variety of colors of light such as red, green, blue and UV light. Developement of film growth technologies and materials for devices can realize highly efficient white radiation using fluorescent materials or by combining colors, and have advantages of low power consumption, semi-permanent lifespan, low response time, safety, and environmental friendliness, as compared to conventional light sources such as fluorescent lamps or incandescent lamps.

Accordingly, the application range of such a light emitting device has been extended to transmission modules of optical communication systems, light emitting diode backlights of display devices such as liquid crystal displays (LCDs), as alternatives to cold cathode fluorescence lamps (CCFLs), and white light emitting diode illuminators, vehicle headlights and traffic lights, as alternatives of fluorescent lamp or incandescent lamps.

SUMMARY OF THE INVENTION

Accordingly, the present invention is directed to a backlight unit and a display device including the same.

It is one object of the present invention to enable easy connection of a backlight provided with a light-emitting device.

To achieve these objects and other advantages and in accordance with the purpose of the invention, as embodied and broadly described herein, provided is a backlight unit including: a bracket on which a light emitting device array is disposed; and a bottom cover on which the bracket is disposed, the bottom cover supporting an optical member, wherein a fixing member to removably fix is provided on the bottom cover, the side and top of the fixing member are flat and the cross-sectional area of the fixing member contacting the bottom cover is equal to or less than the cross-sectional area of the top of the fixing member.

The optical member may or may not include a hole into which the fixing member is inserted.

The optical member may or may not be at least one of a reflective plate, a light-guide plate and an optical sheet.

The vertical cross-section of the fixing member may or may not be in the shape of a reversed trapezoid.

One side of the reversed trapezoid may or may not shape an angle of 60 to 80 degrees with a planar plane.

One side of the fixing member may or may not be vertical to the planar plane and another side thereof may or may not be inclined to the planar plane.

Alternatively, one side of the fixing member may or may not be vertical to the planar plane and another side thereof may or may not shape an angle of 60 to 80 degrees with the planar plane.

In accordance with another aspect of the present invention, provided is a backlight unit including: a bracket on which a light emitting device array is disposed; and a bottom cover on which the bracket is disposed, the bottom cover supporting an optical member, wherein a fixing member to removably fix is provided on the bottom cover, the fixing member includes at least two fixing portions, the first fixing portion is inserted into the optical member and the second fixing portion is inserted into the top cover.

The first fixing portion may or may not be directly contact with the second fixing portion.

The height of the first fixing portion may or may not be above to a total of the height of the optical member, and the distance between the optical member and the top cover.

The first fixing portion may or may not have the smallest width in a region in which the first fixing portion contacts the bottom cover.

The vertical cross-section of the first fixing member may or may not be in the shape of a reversed trapezoid.

One side of the reversed trapezoid may or may not shape an angle of 60 to 80 degrees with respect to a planar plane.

One side of the first fixing portion may or may not be vertical to the planar plane and another side thereof may or may not be inclined to the planar plane.

The cross-sectional area of the first fixing portion may or may not be equal to or greater than the cross-sectional area of the second fixing portion.

One side of the first fixing portion may or may not shape a straight line with one side of the second fixing portion.

In accordance with yet another aspect of the present invention, provided is a display device including: an optical member to direct light from a light emitting device module, in which a light emitting device array supported on a bottom cover is disposed on a bracket, and a backlight unit toward a panel; and a panel provided on the optical member and the panel realizing an image based on the directed light, wherein a fixing member to removably fix the optical member is provided on the bottom cover and the cross-sectional area of the fixing member contacting the bottom cover differs from the cross-sectional area of the top of the fixing member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, preferred embodiments to accomplish the object of the present invention will be described with reference to the annexed drawings.

In the description of the embodiments, it will be understood that when a layer (or film), a region, a pad, a pattern or a structure are referred to as being 'on/under' another layer, region, pad, pattern or substrate, they can be directly on another layer, region, pad, pattern or substrate, or one or more intervening layers, regions, pads, patterns or structures may also be present therebetween. Also, "on/under" each layer is illustrated based on the drawings.

In the drawings, the thickness or size of layers are exaggerated, omitted or schematically shown for better understanding and clarity. Also, the size of the elements may differ from an actual size thereof.

Figure 1:
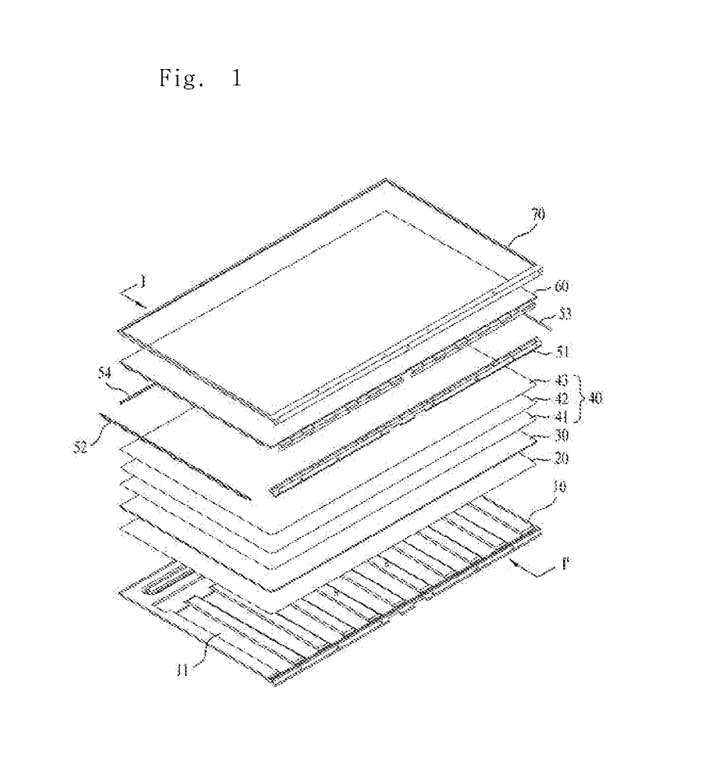
FIG. 1 is an exploded perspective view of a display device according to one embodiment.

FIG. 1 is an exploded perspective view of a display device according to one embodiment.

As shown in FIG. 1, in one embodiment, the display device includes a bottom cover 10, a light-emitting device package module (not shown) provided at an inner side of the bottom cover, a reflective plate 20 arranged on the front surface of the bottom cover 10, a light-guide plate 30 arranged on the front surface of the reflective plate 20, to guide light from the light-emitting module toward the an optical sheet 40, the optical sheet 40 arranged on the front surface of the light-guide plate 30, a liquid crystal display panel 60 arranged on the front surface of the optical sheet 40, a top cover 70 arranged on the front surface of the liquid crystal display panel 60, and connection members 51, 52, 53 and 54 interposed between the bottom cover 10 and the top cover 70, to join the bottom cover 10 to the top cover 70.

The light-guide plate 30 guides such that light is emitted in the form of a planar light source from the light-emitting module (not shown) and the reflective plate 20 arranged on the rear surface of the light-guide plate 30 directs light from the light-emitting device package module (not shown) toward the light-guide plate 30, thereby improving optical efficiency.

The reflective plate 20 may or may not be provided as an additional constituent element or a coating of a highly reflective material on the front of the bottom cover 10 or rear surface of the light-guide plate 30.

The reflective plate 20 may or may not be made of a material which has a high reflectance and is ultrathin, for example, polyethylene terephthalate (PET).

In addition, the light-guide plate 30 scatters light emitted from light-emitting device package module and uniformly distributes the light on the front surface of the screen of the liquid crystal display device. Accordingly, the light-guide plate 30 is made of a material having a high refractive index and high transmissivity, and examples of the material include polymethylmethacrylate (PMMA), polycarbonate (PC) and polyethylene (PE).

In addition, the optical sheet 40 is provided on the light-guide plate 30 to diffuse light from the light-guide plate 30 at a predetermined angle. The optical sheet 40 uniformly directs light guided via the light-guide plate 30 toward the liquid crystal display panel 60.

The optical sheet 40 may or may not be a laminated sheets comprising of a diffusion sheet 41, a prism sheet 42 or a protective sheet 43, or a micro lens array (not shown). A plurality of optical sheets may or may not be used, or the optical sheet may or may not be made of a transparent resin such as an acrylic resin, a polyurethane resin or a silicone resin. In addition, a fluorescent sheet may or may not be included in the prism sheet.

In addition, a liquid crystal display panel 60 may or may not be provided on the front surface of the optical sheet 40. Herein, in addition to the liquid crystal display panel 60, other display devices requiring a light source may or may not be further provided.

The liquid crystal display panel 60 has a structure in which liquid crystal is sealed between two glass substrates and a polarizer is placed on the glass substrates to utilize polarization of light. The liquid crystal used herein is an intermediate between a liquid and a solid, in which a liquid crystal, an organic molecule which is flowable like a liquid is uniformly aligned like a crystal and displays an image through variation of the molecular alignment induced by application of an electrical field.

The liquid crystal display panel for the display device is in an active matrix mode, which uses a transistor as a switch to control voltage supplied to each pixel.

The configuration of the liquid crystal display panel is known in the art and a detailed explanation thereof is thus omitted.

In addition, a color filter (not shown) is provided on the front surface of the liquid crystal display panel 60. Through the color filter, respective pixels selectively transmit red, green or blue among light emitted from the liquid crystal display panel 60, to realize an image.

Figure 2:
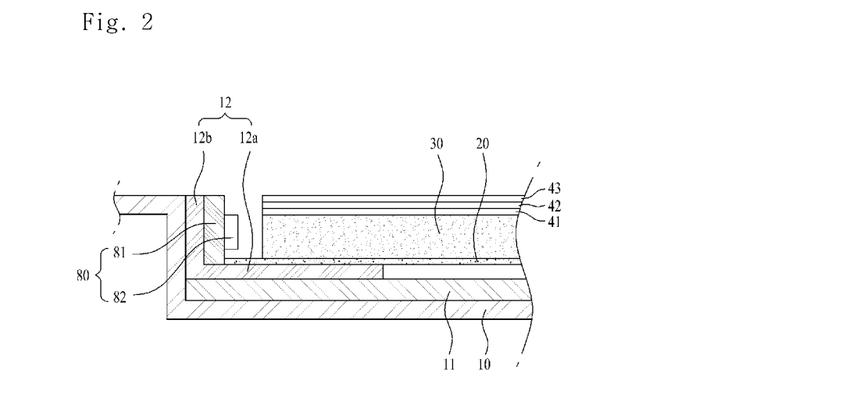
FIG. 2 is a sectional view illustrating a light-emitting device module of the display device of FIG. 1.

FIG. 2 is a sectional view illustrating a light-emitting device module of the display device of FIG. 1.

As shown in FIG. 2, the reflective plate 20 is arranged on the bottom cover 10 and the light-guide plate 30 is arranged on the reflective plate 20. In addition, the reflective plate 20 may or may not come directly into contact with a heat-dissipating member 11. The heat-dissipating member 11 is disposed between the bottom cover and a bracket 12.

The bracket 12 may or may not be provided in the shape of "L", the light-emitting module 80 is adhered to one portion 12b thereof and another portion 12a thereof may or may not come into planar contact with the heat-dissipating member 11.

Figure 3A:
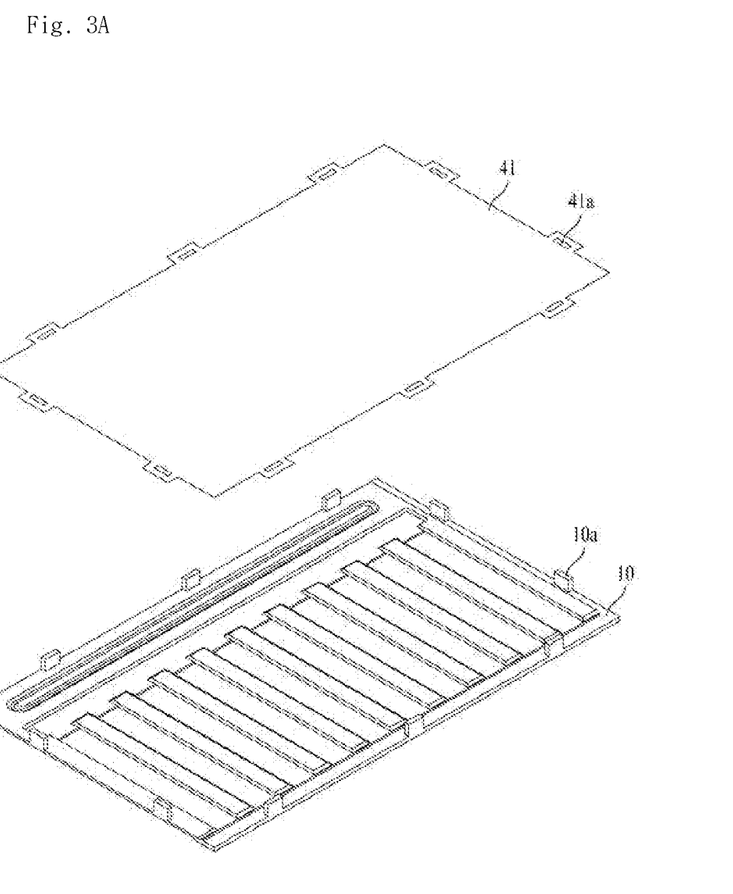
FIG. 3A illustrates a bottom cover and an optical member of FIG. 1 according to a first embodiment.
Figure 3B:
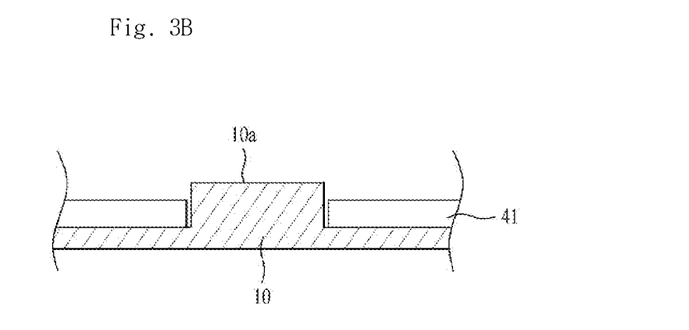
FIG. 3B illustrates a connection state of the embodiment of FIG. 3A.

FIG. 3A illustrates the bottom cover and the diffusion sheet of FIG. 1 according to one embodiment, and FIG. 3B illustrate a connection structure of the embodiment of FIG. 3A.

As shown in the drawings, plurality of fixing members 10a for removably fixing the diffusion sheet 41 are provided on the bottom cover 10. Specifically, the fixing member 10a taking a rectangle is arranged perpendicularly to the bottom cover 10 at each side of the bottom cover 10.

In addition, a plurality of holes 41a are formed on the edge of the diffusion sheet 41 and at least one hole 41a may or may not be formed at each edge thereof. Herein, the fixing member 10a on the bottom cover 10 is inserted into the hole 41a of the edge of the diffusion sheet 41 to join the bottom cover 10 to the diffusion sheet 41.

As described above, the bottom cover 10 may or may not be removably joined to the diffusion sheet 41, the number of fixing members 10a present on the bottom cover 10 may or may not be the equivalent to or less than the number of the holes 41a present on the edge of the diffusion sheet 41.

As shown in FIG. 3A, the diffusion sheet 41 is inserted into and disposed on the bottom cover 10, and, in addition to the diffusion sheet 41, elements such as the reflective plate 20, the light-guide plate 30, the prism sheet 42, the protective sheet 43 and micro lens array may be inserted into and disposed on the bottom cover 10 is inserted into and disposed on the bottom cover 10 in the same configuration as the diffusion sheet 41. Hereinafter, the element such as the diffusion sheet 41, reflective plate 20, light-guide plate 30, prism sheet 42, protective sheet 43 and micro lens array will be collectively referred to as an optical member.

In addition, as shown in FIG. 3B, the diffusion sheet 41 is inserted into the fixing member 10a such that the diffusion sheet 41 is spaced from the fixing member 10a by a predetermined distance, this distance provides for thermal expansion of the diffusion sheet 41 and such a distance may or may not be applied to the other embodiments.

Figure 4A:
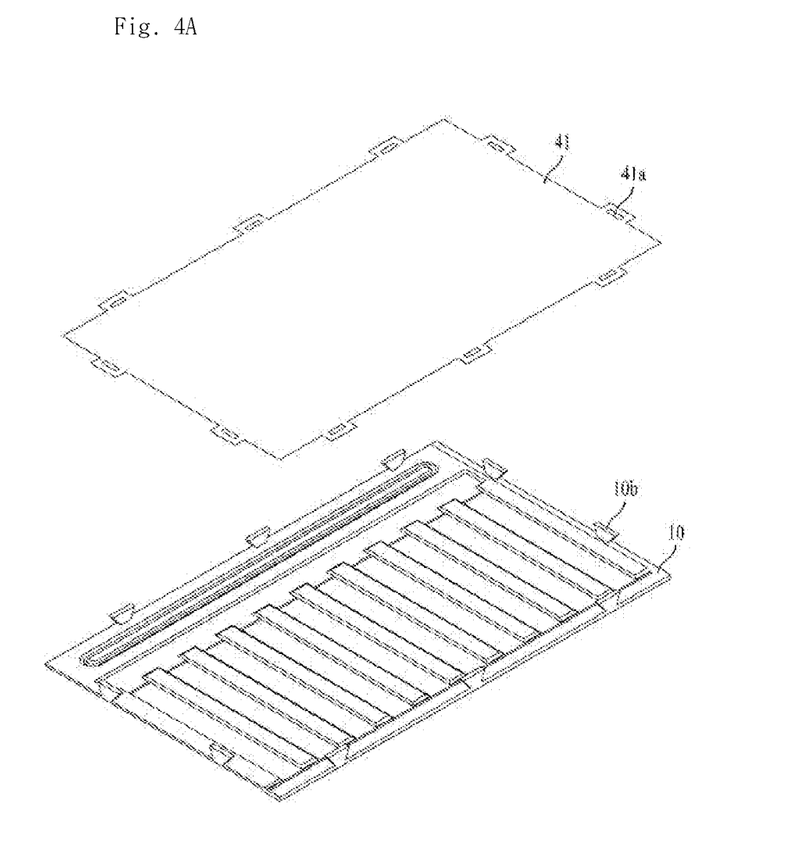
FIG. 4A illustrates a bottom cover and an optical member of FIG. 1 according to a second embodiment.
Figure 4B:
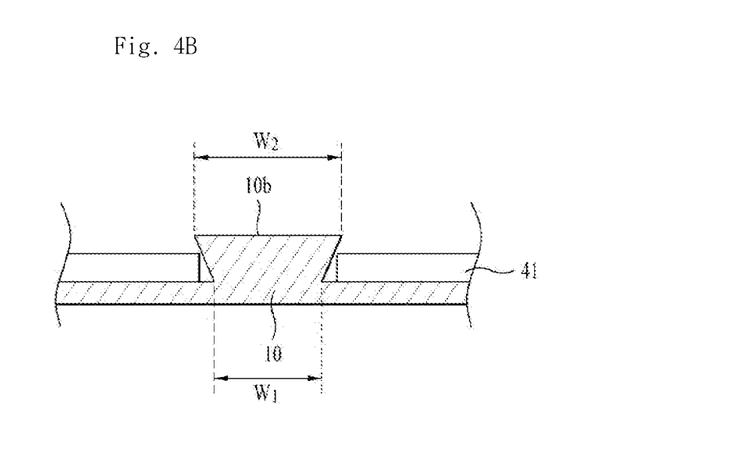
FIG. 4B is a view illustrating a connection state of the embodiment of FIG. 4A.

FIG. 4A illustrates the bottom cover and the diffusion sheet of FIG. 1 according to a second embodiment. FIG. 4B is a view illustrating a connection structure of the embodiment of FIG. 4A. As shown in the drawings, a fixing member 10b for removably fixing the diffusion sheet 41 is provided on the bottom cover 10. Specifically, the rectangular fixing member 10b is arranged perpendicularly to the bottom cover 10 at each side of the bottom cover 10.

Although two fixing members 10b are provided at the short sides of the rectangle and three fixing members 10b are provided at the long sides of the rectangle in FIG. 4A, the fixing member 10b serves to fix the diffusion sheet 41 and at least one fixing member 10b may or may not thus be provided at each side of the rectangle.

Unlike the embodiment illustrated in FIG. 3A, the side and top of the fixing member 10b are flat and the cross-sectional area of the fixing member 10b contacting the bottom cover 10 is smaller than the cross-sectional area of top of the fixing member 10b. That is, the fixing member 10b take the shape of a reversed trapezoid wherein a region at which the fixing member 10b contacts the bottom cover 10 is the narrowest. Accordingly, in FIG. 4B, the fixing member 10b has the smallest width W1 in a region in which the fixing member 10b contacts the bottom cover and the largest width W2 on the top.

In addition, a hole 41a is provided on the edge of the diffusion sheet 41 and at least one hole 41a may or may not be formed on each side. At this time, the fixing member 10b on the bottom cover 10 is inserted into the hole 41a provided on the edge of the diffusion sheet 41 to join the bottom cover 10 to the diffusion sheet 41.

As described above, the bottom cover 10 may or may not be removably joined to the diffusion sheet 41, the number of fixing members 10b present on the bottom cover 10 may or may not be equal to or less than the number of the holes 41a present at the edge of the diffusion sheet 41.

Unlike the structure illustrated in FIG. 3A, the diffusion sheet 41 of this embodiment is not readily detached due to the structure of the fixing member 10b of the bottom cover 10. That is, even if the backlight unit or display devices are reversely transported in a handling process, the diffusion sheet 41 remains joined to the bottom cover 10 due to the afore-mentioned structure of the fixing member 10b.

Figure 4C:
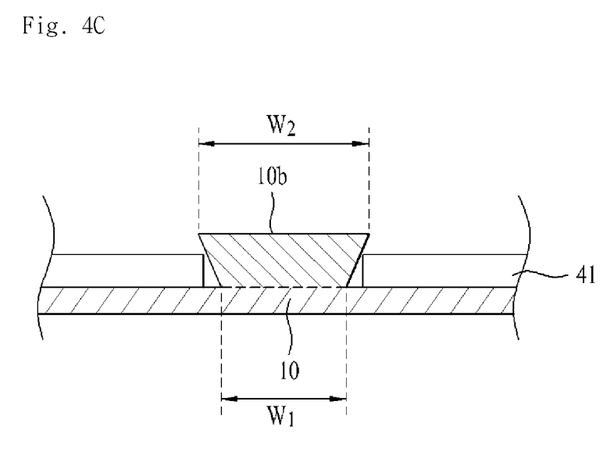
FIG. 4C is a view illustrating another connection state of the embodiment of FIG. 4A.

FIG. 4C is a view illustrating another connection state of the embodiment of FIG. 4A. As shown in FIG. 4A, a fixing member 10b is provided as an additional constituent element on the front of the bottom cover 10. And, fixing members and a bottom cover in other embodiments may or may not be provided in a body or as an additional constituent element.

And, the cross-sectional area of a lower part of the fixing member 10b may or may not be equal to or less than the cross-sectional area of an upper part of the fixing member 10b. The lower part of the fixing member 10b may be closer to the bottom cover 10 than the upper part of the fixing member 10b. And, a length of side W1 of the lower part of the fixing member 10b may be equal to or less then a length of side W2 of the upper part of the fixing member 10b.

Although a joining structure of the diffusion sheet and the bottom cover 10 has been described in this embodiment, the joining structure is also applicable to the reflective plate 20, light-guide plate 30 or other sheets (e.g., the prism sheet 42, protective sheet 43 and micro lens array), inside the optical sheet 40, as illustrated above, and the same will be applied to the embodiments below.

In addition, the width of the hole 41a should be equal to or greater than the width of the bottom of the fixing member 10b so that it can be used as the joining member. As illustrated in the drawing, the hole 41a may or may not be formed in a protrusion arranged parallel to the diffusion sheet 41 in a direction of the edge of the diffusion sheet 41.

As shown in the sectional view of FIG. 4A, when the fixing member 10b is inserted into the hole 41a formed on the diffusion sheet 41, the width of the hole 41a formed on the diffusion sheet 41 may or may not be equal to or greater than the with of the bottom side of the fixing member 10b and may or may not be smaller than the width of the top side of the fixing member 10b. At this time, although the width of hole 41a formed on the diffusion sheet 41 is equal to or less than the width of top side of the fixing member 10b, the fixing member 10b is inserted from the one side thereof, thus enabling joining/connection.

Figure 5A:
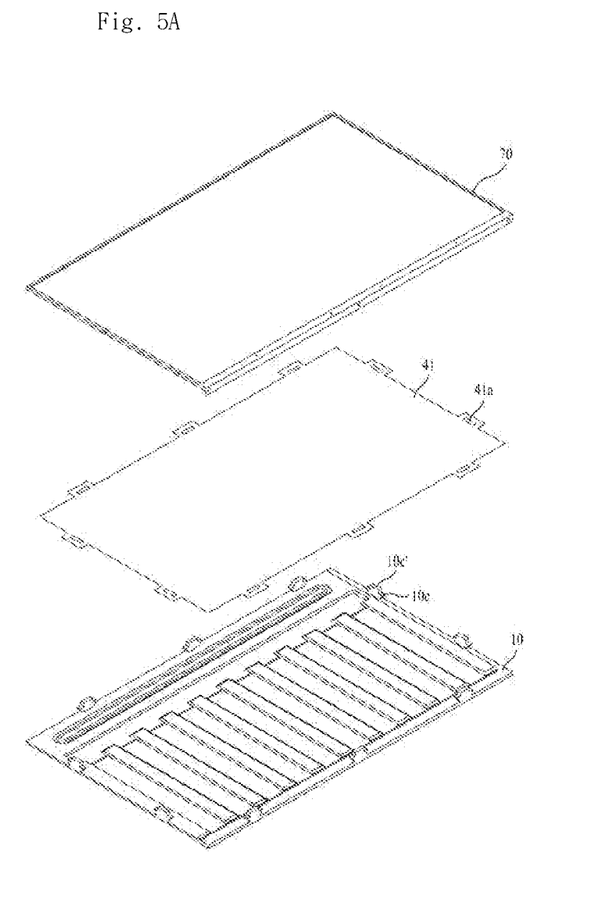
FIG. 5A illustrates a bottom cover and an optical member of FIG. 1 according to a third embodiment.
Figure 5B:
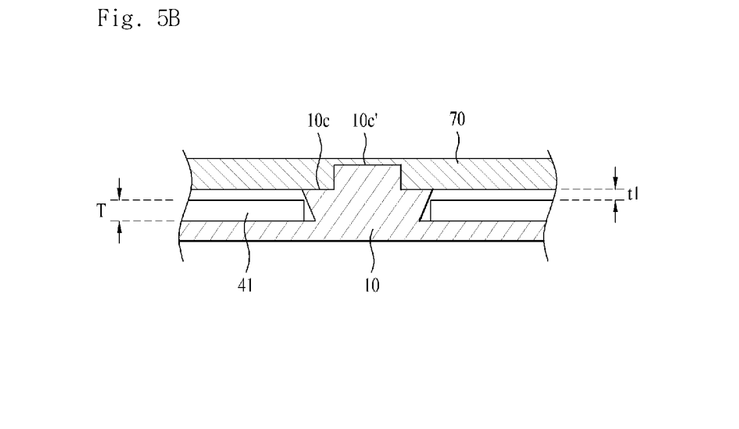
FIG. 5B is a view illustrating a connection state of the embodiment of FIG. 5A.

FIG. 5A illustrates the bottom cover and the diffusion sheet of FIG. 1 according to a third embodiment. FIG. 5B is a view illustrating a connection state of the embodiment of FIG. 5A.

This embodiment is basically similar to the embodiment illustrated in FIG. 4A, but a fixing member including two fixing portions is provided on the bottom cover 10. At this time, a region in which the fixing member is adjacent to the bottom cover 10 is referred to as a first fixing portion 10c, and a region in which the fixing portion branches from the first fixing portion 10c is referred to as a second fixing portion 10c'. That is, the first fixing portion 10c is a region where the diffusion sheet 41 is inserted and the second fixing portion 10c' is a region where the top cover is inserted.

The sectional area of the first fixing portion 10c may or may not be equal to or greater than that of the second fixing portion 10c', the first fixing portion 10c is provided in a reversed trapezoid and the second fixing portion 10c' is provided as a rectangle or square. At this time, the first fixing portion 10c is inserted into and disposed on the diffusion sheet 41, and the second fixing portion 10c' is inserted into and disposed on the top cover 70. The expression "inserted into and disposed on"

as used herein means that a fixing member of the bottom cover 10 is inserted into the hole provided on the edge of the diffusion sheet 41 or top cover 70.

That is, the first fixing portion 10c serves as a fixing member of diffusion sheet 41 and the second fixing portion 10c' serves as a fixing member of the top cover 70. In addition, the height of the first fixing portion 10c should be greater than or equal to a total of thicknesses of optical members connected to the first fixing portion 10c, as illustrated below in FIG. 6B. As shown in FIG. 5B, in addition, the height of the first fixing portion 10c should be greater than or equal to the thickness T of diffusion sheet 41 connected to the first fixing portion 10c, and the height of the second fixing portion 10c' may or may not be equal to or less than the thickness of the top cover 70. That is, the diffusion sheet 41 is connected to the bottom cover 10 through the first fixing portion 10c of the fixing member and the top cover 70 is connected to the second fixing portion 10c'. The height of first fixing portion 10c is greater than or equal to a sum of thicknesses of diffusion sheet 41 and distance t1.

Accordingly, the distance (t) prevents the top cover 70 from pressing the diffusion sheet 41.

Figure 6A:
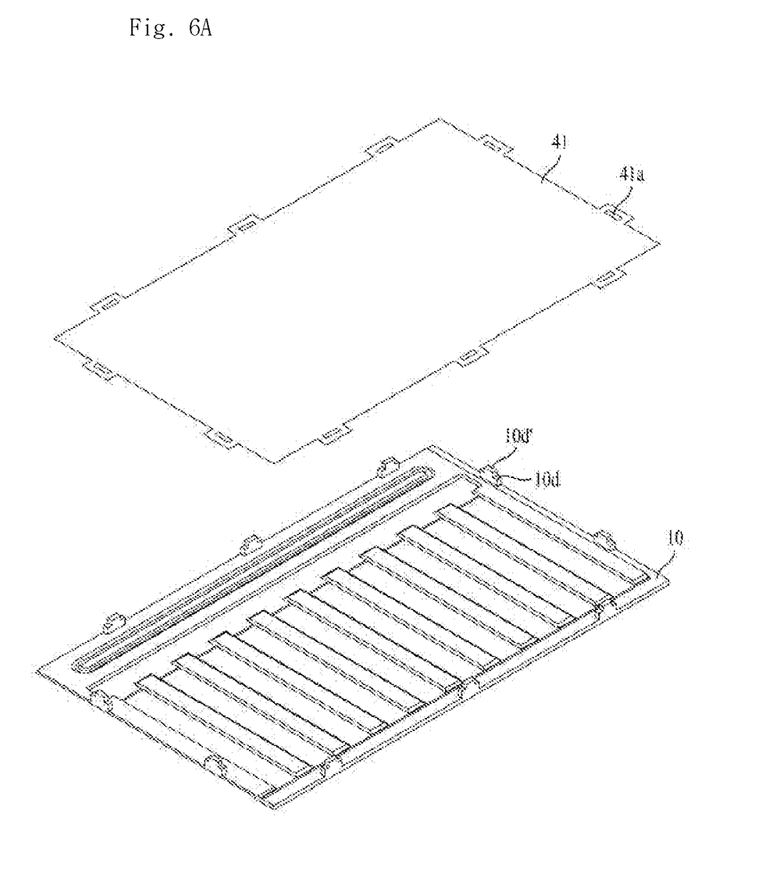
FIG. 6A illustrates a bottom cover and an optical member of FIG. 1 according to a fourth embodiment.
Figure 6B:
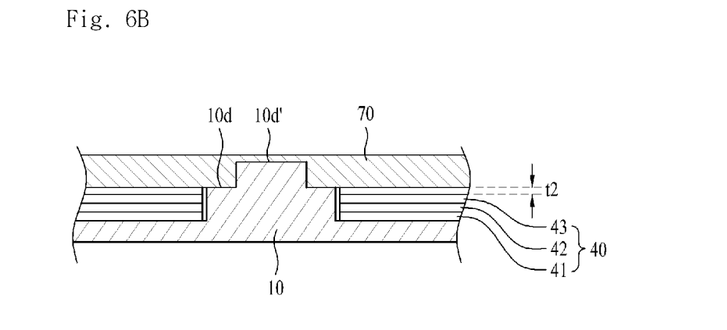
FIG. 6B is a view illustrating a connection state of the embodiment of FIG. 6A.

FIG. 6A illustrates the bottom cover and the diffusion sheet of FIG. 1 according to a fourth embodiment. FIG. 6B is a view illustrating a connection state of the embodiment of FIG. 6A.

Like the embodiment illustrated in FIG. 5, a fixing member including two fixing portions is provided on the bottom cover 10. Unlike FIG. 5, the first fixing portion 10d and the second fixing portion 10d' on the bottom cover 10 may or may not be provided in the shape of a rectangle or square. In addition, the first fixing portion 10d may or may not be connected to the diffusion sheet 41 and the second fixing portion 10d' may or may not be connected to the top cover, as described above.

As shown in FIG. 6B, in addition, the thickness of the first fixing portion 10d should be greater than or equal to a total of thicknesses of optical members 40 connected to the first fixing portion 10d and the height of the second fixing portion 10d' may or may not be equal to or less than the thickness of top cover 70. That is, optical members 41, 42 and 43 are connected to the bottom cover 10 through the first fixing portion 10d of the fixing member, and the top cover 70 is connected to the second fixing portion 10d' such that the top cover 70 is spaced from the second fixing portion 10d' by a predetermined distance (t2). And, the cross-sectional area of the first fixing portion 10d is equal to or greater than the cross-sectional area of the second fixing portion 10d'.

Accordingly, the distance (t2) prevents the top cover 70 from pressing the optical members 41, 42 and 43.

The optical members connected to the first fixing portion 10d may or may not include a reflective plate or light-guide plate, in addition to the three layers illustrated in the drawing.

Figure 7A:
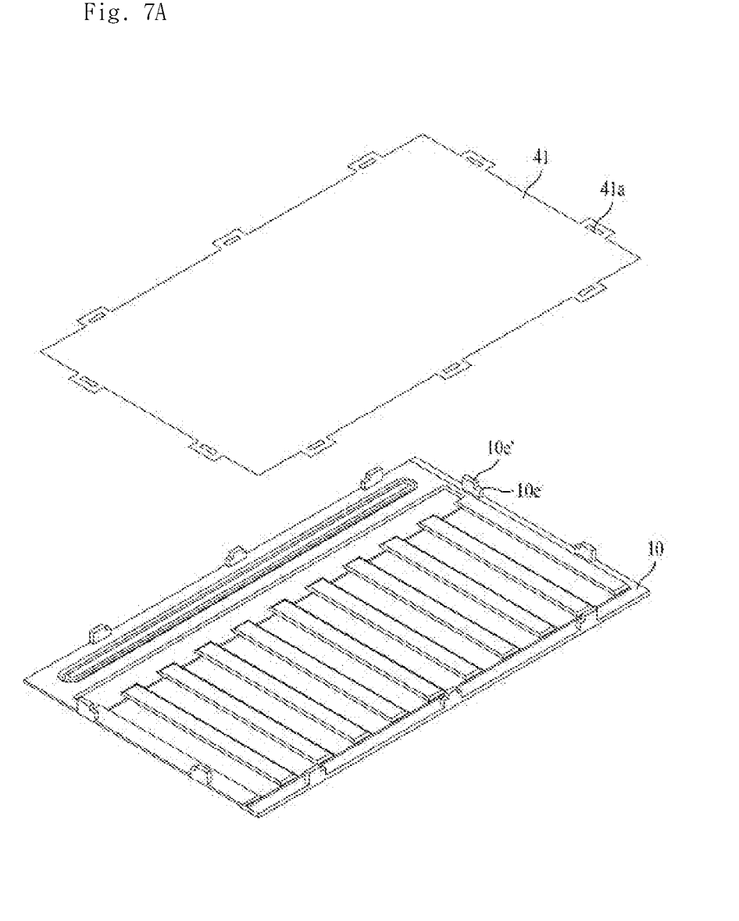
FIG. 7A illustrates a bottom cover and an optical member of FIG. 1 according to a fifth embodiment.
Figure 7B:
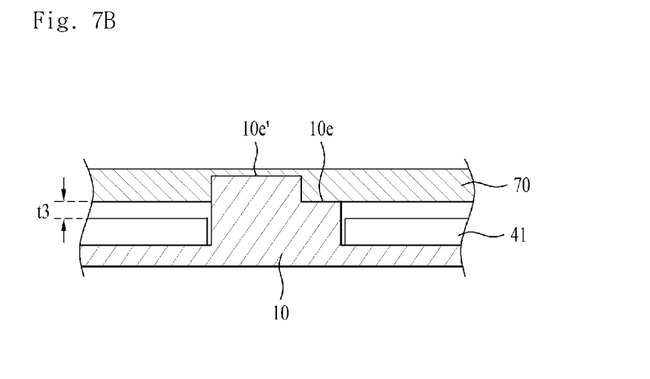
FIG. 7B is a view illustrating a connection state of the embodiment of FIG. 7A.

FIG. 7A illustrates the bottom cover and the diffusion sheet of FIG. 1 according to a fifth embodiment. FIG. 7B is a view illustrating a connection state of the embodiment of FIG. 7A.

Like the embodiment illustrated in FIGS. 6A and 6B, a fixing member including two fixing portions is provided on the bottom cover 10. Unlike FIG. 6, one side of the first fixing portion 10e and one side of the second fixing portion 10e' on the bottom cover 10 may or may not be at the same level. The first fixing portion 10e may or may not be connected to the diffusion sheet 41 and the second fixing portion 10e' may or may not be connected to the top cover 70, as described above.

That is, the diffusion sheet 41 is connected to the bottom cover 10 through the first fixing portion 10e of the fixing member, and the top cover 70 is connected to the second fixing portion 10e' such that the top cover 70 is spaced from the second fixing portion 10e' by a predetermined distance (t3). For this reason, the distance (t3) prevents the top cover 70 from pressing the diffusion sheet 41. The structure of the fixing member on the bottom cover 10 is simple, as compared to the embodiment illustrated in FIG. 6, and is advantageous in terms of simplification of the manufacturing process of the bottom cover, in particular, injection molding.

In FIG. 7B, the first fixing portion 10e is inserted into the diffusion sheet 41, and specifically, the first fixing portion 10e may be inserted into the hole 41a (FIG. 7A) of the edge of the diffusion sheet 41. And, one side of the first fixing portion 10e forms a straight line with one side of the second fixing portion 10e'.

In addition, the first fixing portion 10e is inserted into and connected to the diffusion sheet 41 such that the diffusion sheet 41 is spaced from the top cover 70 by a predetermined distance, and this distance provides for the case of thermal expansion of the diffusion sheet 41. The second fixing portion 10e' may be inserted into and connected to the top cover 70. In addition, the thickness of the first fixing portion 10e is equal to or greater than the thickness of the diffusion sheet 41, thus securing a predetermined distance. This distance prevents the top cover 70 from pressing the diffusion sheet 41, as described above.

Figures 8A, 8B:
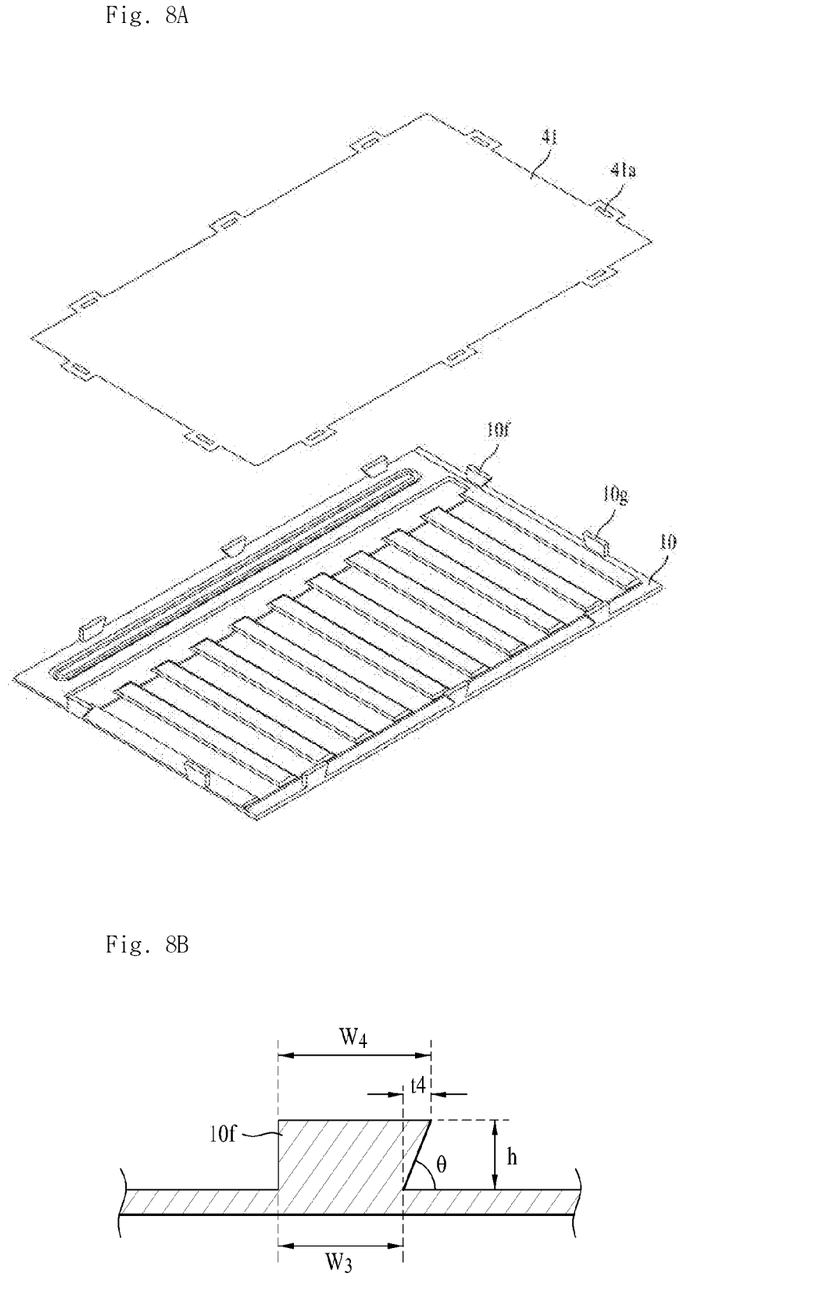
FIG. 8A illustrates a bottom cover and an optical member of FIG. 1 according to a sixth embodiment.
FIG. 8B is a detailed view illustrating the structure of fixing member of FIG. 8A.

FIG. 8A illustrates the bottom cover and the diffusion sheet of FIG. 1 according to a sixth embodiment.

The structure illustrated in FIG. 8A is basically similar to the structure illustrated in FIG. 4, but the fixing member 10f and 10g on the bottom cover 10 have at least one slope. That is, although only one side of the fixing member 10f is in the shape of a reversed trapezoid, detachment of the diffusion sheet 41 can be prevented and is advantageous in terms of processes such as injection molding of bottom cover 10.

FIG. 8B is a detailed view illustrating the structure of the fixing member of FIG. 8A.

As illustrated in the drawing, only one side of the fixing member is vertical to the bottom cover and only one side thereof forms a predetermined angle therewith. The predetermined angle ($\theta$) may or may not be 60 to 80 degrees. When the angle exceeds 80 degrees, detachment of the optical member cannot be sufficiently prevented, and when the angle is equal to or less than 80 degrees, excessive increase in the size of holes formed to connect and remove the optical member may or may not be disadvantageously inevitable.

Figure 9A:
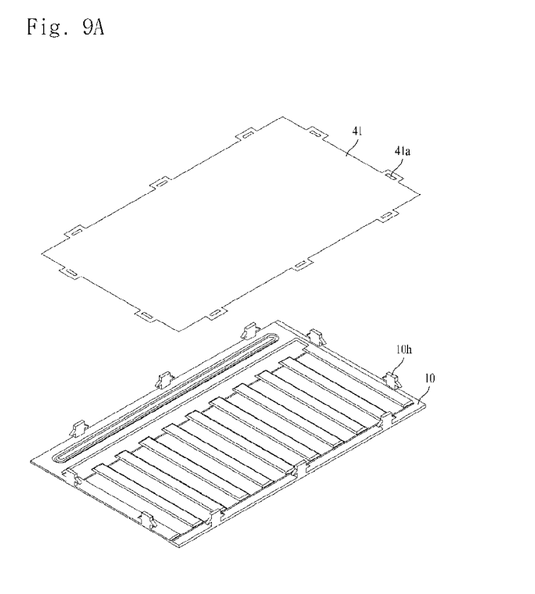
FIG. 9A illustrates a bottom cover and an optical member of FIG. 1 according to a seventh embodiment.

The height (h) of the fixing member may or may not be equivalent to a total of thickness of optical members or the height (h) of the fixing member may or may not be equal to or greater than that of the optical member. In addition, in FIG. 9, the height (h) may or may not be obtained from the equation $t4 = \tan\theta \times h$. In addition, in FIG. 9, the fixing member has the smallest width W3 in a region in which the fixing member 10b contacts the bottom cover and the largest width W4 on the top.

Figure 9B:
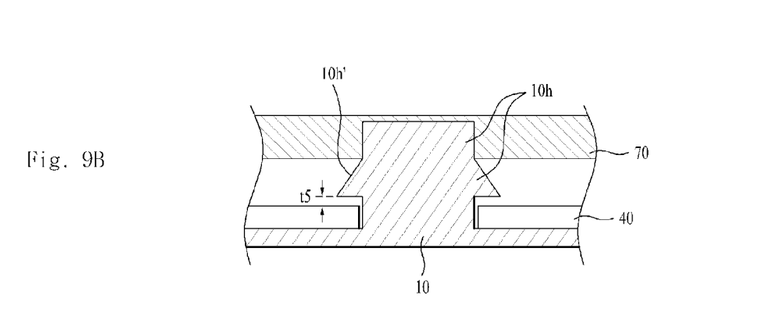
FIGS. 9B and 9C are views illustrating a connection state of the fixing member of FIG. 9A.
Figure 9C:
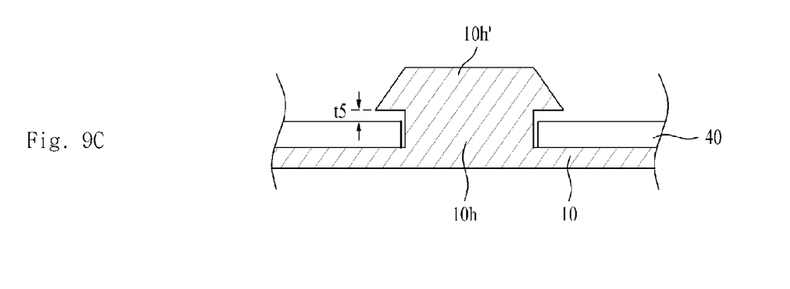

FIG. 9A illustrates the bottom cover and the diffusion sheet of FIG. 1 according to a seventh embodiment. FIGS. 9B and 9C are views illustrating a connection state of FIG. 9A.

In this embodiment, a fixing member 10h is arranged on the bottom cover 10 and the fixing portion 10h' having the shape of a hook is formed on the fixing member 10h. The fixing portion 10h' is in the shape of a trapezoid.

Accordingly, the fixing portion 10h' may prevent separation of the optical member 40 from the bottom cover 10. In addition, the fixing portion 10h' enables easy joining of the optical member 40 to the bottom cover 10.

The optical sheet 40 may or may not include a diffusion sheet, a prism sheet and a protective sheet. In addition, as illustrated in the drawing, the distance from the bottom cover 10 to the fixing portion 10h' corresponds to a sum of the thickness of the optical sheet 40 and the predetermined distance t5.

Accordingly, the predetermined distance t1 prevents application of excessive pressure from the top cover 70 and fixing portion 10h' to the optical member 40.

In addition, in the embodiment illustrated in FIG. 9B, the fixing portion 10h' is arranged in the center of the fixing member 10h, but in the embodiment illustrated in FIG. 9C, the fixing portion 10h' is arranged on the top of the fixing member 10h.

The backlight according to the preferred embodiments may or may not be applied to display devices.

The backlight and display device including a light-emitting device can be readily joined to optical sheets.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit comprising:
   a bracket on which a light emitting device array is disposed; and
   a bottom cover on which the bracket is disposed, the bottom cover supporting an optical member,
   wherein a fixing member removably fixing the optical member is provided on the bottom cover, a surface area of a lower surface of the fixing member is equal to or less than a surface area of an upper surface of the fixing member,
   wherein the fixing member extends from the bottom cover to the optical member, the upper surface of the fixing member and the lower surface of the fixing member are disposed in a direction parallel to a surface of the bottom cover, and the lower surface of the fixing member directly contacts the surface of the bottom cover, and
   wherein at least one side of the fixing member is inclined to the bottom cover.

2. The backlight unit according to claim 1, wherein the optical member includes a hole into which the fixing member is inserted, and a cross section of the hole is a closed curve.

3. The backlight unit according to claim 1, wherein the optical member is at least one of a reflective plate, a light-guide plate and an optical sheet.

4. The backlight unit according to claim 1, wherein the vertical cross-section of the fixing member is in the shape of a reversed trapezoid.

5. The backlight unit according to claim 4, wherein one side of the reversed trapezoid forms an angle of 60 to 80 degrees with the bottom cover.

6. The backlight unit according to claim 1, wherein another side of the fixing member is vertical to the bottom cover.

7. The backlight unit according to claim 1, wherein the at least one side of the fixing member forms an angle of 60 to 80 degrees with the bottom cover.

8. The backlight unit according to claim 1, wherein the side and top of the fixing member are flat.

9. A backlight unit comprising:
   a bracket on which a light emitting device array is disposed; and
   a bottom cover on which the bracket is disposed, the bottom cover supporting an optical member,
   wherein a fixing member removably fixing the optical member is provided on the bottom cover,
   wherein the fixing member includes at least two fixing portions,
   wherein the first fixing portion is inserted into the optical member and the second fixing portion is inserted into a top cover, and
   wherein the first fixing portion directly contacts the second fixing portion.

10. The backlight unit according to claim 9, wherein the height of the first fixing portion is greater than or equal to a total of the height of the optical member, and the distance between the optical member and the top cover.

11. The backlight unit according to claim 9, wherein the first fixing portion has the smallest width in a region where the first fixing portion contacts the bottom cover.

12. The backlight unit according to claim 9, wherein the vertical cross-section of the first fixing portion is in the shape of a reversed trapezoid.

13. The backlight unit according to claim 12, wherein one side of the reversed trapezoid forms an angle of 60 to 80 degrees with respect to the bottom cover.

14. The backlight unit according to claim 12, wherein one side of the first fixing portion is vertical to the bottom cover and another side thereof is inclined to the bottom cover.

15. The backlight unit according to claim 9, wherein the cross-sectional area of the first fixing portion is equal to or greater than the cross-sectional area of the second fixing portion.

16. The backlight unit according to claim 9, wherein one side of the first fixing portion forms a straight line with one side of the second fixing portion.

17. A backlight unit comprising:
   a bracket on which a light emitting device array is disposed; and
   a bottom cover on which the bracket is disposed, the bottom cover supporting an optical member,
   wherein a fixing member fixing the optical member removably is provided on the bottom cover,
   wherein the fixing member includes at least a first fixing portion and a second fixing portion,
   wherein the first fixing portion is inserted into the optical member and the second fixing portion is inserted into a top cover, and
   wherein the first fixing portion has the smallest width in a region where the first fixing portion contacts the bottom cover.

18. The backlight unit according to claim 17, wherein the first fixing portion directly contacts the second fixing portion.

19. The backlight unit according to claim 17, wherein one side of the first fixing portion is vertical to the bottom cover and another side of the first fixing portion is inclined to the bottom cover.

20. The backlight unit according to claim 17, wherein one side of the first fixing portion forms a straight line with one side of the second fixing portion.

* * * * *